(12) United States Patent
Shaw

(10) Patent No.: US 12,245,039 B2
(45) Date of Patent: *Mar. 4, 2025

(54) SECURITY SYSTEM FOR MANAGING 5G NETWORK TRAFFIC BACKGROUND

(71) Applicant: T-Mobile USA, Inc., Bellevue, WA (US)

(72) Inventor: Venson Shaw, Kirkland, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/347,158

(22) Filed: Jul. 5, 2023

(65) Prior Publication Data
US 2023/0345248 A1    Oct. 26, 2023

Related U.S. Application Data

(63) Continuation of application No. 16/921,765, filed on Jul. 6, 2020, now Pat. No. 11,743,729.

(51) Int. Cl.
*H04W 12/121*    (2021.01)
*H04L 9/40*    (2022.01)
(Continued)

(52) U.S. Cl.
CPC ........... *H04W 12/121* (2021.01); *H04L 63/20* (2013.01); *H04W 28/09* (2020.05);
(Continued)

(58) Field of Classification Search
CPC ......... H04W 28/09; H04W 72/50–569; H04W 84/042; H04L 63/20
See application file for complete search history.

(56) References Cited

U.S. PATENT DOCUMENTS 6,167,445 A     12/2000 Gai et al.
6,457,051 B1 *  9/2002 Riddle ................ H04L 41/5022
                                                709/224
(Continued)

FOREIGN PATENT DOCUMENTS

CN          104301895 A        1/2015
CN          105471835 A        4/2016
(Continued)

OTHER PUBLICATIONS

F. Pacheco, et al., "Towards the Deployment of Machine Learning Solutions in Network Traffic Classification: A Systematic Survey," in IEEE Communications Surveys & Tutorials, vol. 21, No. 2, pp. 1988-2014, (Year: 2018).

(Continued)

*Primary Examiner* — Madhuri R Herzog
(74) *Attorney, Agent, or Firm* — Perkins Coie LLP

(57) ABSTRACT

The technology includes a method performed by a system of a telecommunications network to manage network traffic of a 5G network. The system can instantiate a security system to sort incoming or outgoing network traffic at a perimeter of the 5G network into multiple groups that are each uniquely associated with multiple traffic types and multiple security levels. The system can inspect segments of data included in the incoming network traffic and sort multiple portions of the network traffic into the groups based in part on the inspection of the segments of the data. The system can dynamically adjust an available bandwidth of the 5G network based on each load of each of the groups and dispatch the portions of the network traffic in accordance with a traffic type and a security level of each of the groups.

20 Claims, 7 Drawing Sheets

(51) Int. Cl.
*H04W 28/08* (2023.01)
*H04W 72/542* (2023.01)
*H04W 72/56* (2023.01)
*H04W 84/04* (2009.01)

(52) U.S. Cl.
CPC ......... *H04W 72/542* (2023.01); *H04W 72/56* (2023.01); *H04W 84/042* (2013.01)

(56) References Cited

U.S. PATENT DOCUMENTS

| | | |
|---|---|---|
| 6,597,658 B1 | 7/2003 | Simmons |
| 7,321,555 B2 | 1/2008 | Rodriguez et al. |
| 7,565,692 B1 | 7/2009 | Maria |
| 7,596,811 B2 | 9/2009 | Lloyd et al. |
| 7,891,001 B1 | 2/2011 | Greenawalt et al. |
| 7,895,353 B2 | 2/2011 | Jansson |
| 7,895,642 B1 | 2/2011 | Larson et al. |
| 8,037,519 B2 | 10/2011 | Kalofonos et al. |
| 8,136,149 B2 | 3/2012 | Freund |
| 8,271,774 B1 | 9/2012 | Nachenberg et al. |
| 8,284,780 B2 | 10/2012 | Sullivan et al. |
| 8,615,785 B2 | 12/2013 | Elrod et al. |
| 8,619,799 B1 | 12/2013 | Thodupunoori et al. |
| 8,693,345 B2 | 4/2014 | Lee et al. |
| 8,750,125 B2 | 6/2014 | Harmatos |
| 9,516,053 B1 | 12/2016 | Muddu et al. |
| 9,635,663 B2* | 4/2017 | Murphy ................ H04W 12/08 |
| 11,516,670 B2 | 11/2022 | Shaw |
| 2001/0055283 A1 | 12/2001 | Beach |
| 2004/0122967 A1 | 6/2004 | Bressler et al. |
| 2004/0208131 A1 | 10/2004 | Rodriguez et al. |
| 2005/0129019 A1 | 6/2005 | Cheriton |
| 2005/0273850 A1 | 12/2005 | Freund |
| 2005/0281253 A1 | 12/2005 | Veijalainen et al. |
| 2006/0007936 A1 | 1/2006 | Shrum et al. |
| 2006/0092841 A1 | 5/2006 | Lloyd et al. |
| 2007/0022468 A1 | 1/2007 | Iijima et al. |
| 2007/0089165 A1 | 4/2007 | Wei et al. |
| 2007/0118894 A1 | 5/2007 | Bhatia |
| 2007/0211696 A1 | 9/2007 | Noble |
| 2007/0211697 A1 | 9/2007 | Noble |
| 2008/0031219 A1 | 2/2008 | Zou |
| 2008/0062876 A1 | 3/2008 | Giroux et al. |
| 2008/0089237 A1 | 4/2008 | Molen et al. |
| 2008/0198747 A1 | 8/2008 | Young et al. |
| 2008/0232304 A1 | 9/2008 | Mooney et al. |
| 2009/0059952 A1 | 3/2009 | Kalofonos et al. |
| 2009/0122699 A1 | 5/2009 | Alperovitch et al. |
| 2009/0219940 A1 | 9/2009 | Jansson |
| 2010/0208614 A1 | 8/2010 | Harmatos |
| 2010/0325272 A1 | 12/2010 | Lloyd et al. |
| 2011/0161399 A1 | 6/2011 | Agulnik et al. |
| 2012/0300754 A1 | 11/2012 | Rosenqvist et al. |
| 2012/0304277 A1 | 11/2012 | Li et al. |
| 2015/0089566 A1 | 3/2015 | Chesla |
| 2015/0134232 A1 | 5/2015 | Robinson |
| 2015/0341379 A1 | 11/2015 | Lefebvre et al. |
| 2015/0373043 A1 | 12/2015 | Wang et al. |
| 2016/0021600 A1 | 1/2016 | Keller et al. |
| 2017/0346609 A1* | 11/2017 | Li ........................ H04W 72/56 |
| 2018/0063195 A1 | 3/2018 | Nimmagadda et al. |
| 2018/0295138 A1* | 10/2018 | Harris ................... H04L 63/205 |
| 2018/0295148 A1 | 10/2018 | Mayorgo |
| 2019/0199646 A1 | 6/2019 | Singh et al. |
| 2019/0207976 A1 | 7/2019 | Yadav et al. |
| 2019/0380037 A1 | 12/2019 | Lifshitz et al. |
| 2020/0329072 A1 | 10/2020 | Dubois et al. |
| 2021/0051175 A1 | 2/2021 | Lyle |
| 2021/0067419 A1 | 3/2021 | Adam et al. |
| 2021/0274416 A1 | 9/2021 | Jendli et al. |
| 2021/0328914 A1* | 10/2021 | Garg ..................... H04L 45/741 |

FOREIGN PATENT DOCUMENTS

| | | |
|---|---|---|
| WO | 2020210015 A1 | 10/2020 |
| WO | 2021152262 A1 | 8/2021 |

OTHER PUBLICATIONS

I. Ahmad, S. Shahabuddin, T. Kumar, J. Okwuibe, A. Gurtov and M. Ylianttila, "Security for 5G and Beyond," in IEEE Communications Surveys & Tutorials, vol. 21, No. 4, pp. 3682-3722, Fourthquarter 2019, doi: 10.1109/COMST.2019.2916180.

* cited by examiner

SECURITY SYSTEM FOR MANAGING 5G NETWORK TRAFFIC BACKGROUND

CROSS-REFERENCE TO RELATED APPLICATIONS

This application is a continuation of U.S. patent application Ser. No. 16/921,765, filed on Jul. 6, 2020, entitled SECURITY SYSTEM FOR MANAGING 5G NETWORK TRAFFIC, which is hereby incorporated by reference in its entirety.

BACKGROUND

In telecommunications, 5G refers to fifth generation wireless communication technologies that support cellular data networks. 3GPP defines any system using 5G New Radio (5G NR) software as 5G. The frequency spectrum of 5G is divided into millimeter wave, mid-band, and low-band. Low-band uses a similar frequency range as LTE/LTE-A, the predecessor to 5G, which is also referred to as 4G communication. Millimeter wave is the fastest, with actual speeds often being 1-2 Gbit/s, at frequencies above 24 GHz, reaching up to 72 GHz. The signal reach of many 5G network access nodes is short and, as such, more cells are required compared to 4G. Further, indoor coverage is limited because millimeter waves have difficulty traversing walls and windows.

5G networks support numerous and different types of communications that provide ultrahigh-speed service delivery and connect a massive number of devices. For example, 5G networks support massively interconnected devices for Internet-of-Things (IOT), mobile broadband (MBB), vehicle-to-everything (V2X), machine-to-machine (M2M), machine-to-everything (M2X), ultra-reliable low latency communication (URLLC), machine-type communication (MTC), and other communications. Each of these communication types may have different transmission and latency requirements. Moreover, 5G networks can require efficient allocation of resources while minimizing conflicts and interference.

Most of these communications and devices are harmless to 5G networks. However, a small fraction of communications pose serious security risks to 5G networks. For example, a small fraction of mobile broadcast sessions are connected in unsecured and/or rogue area networks that are unsecure. Thus, although most interconnected devices on networks are safe, dependable, and reliable, 5G wireless networks create a greater number of vulnerabilities compared to other types of communication networks. The vulnerabilities cannot be addressed with conventional network hardening techniques because deployment across a massively diverse network of devices is cost-prohibitive, resource intensive, and thus impractical.

BRIEF DESCRIPTION OF THE DRAWINGS

Embodiments of the present technology will be described and explained through the use of the accompanying drawings.

Figure 1:
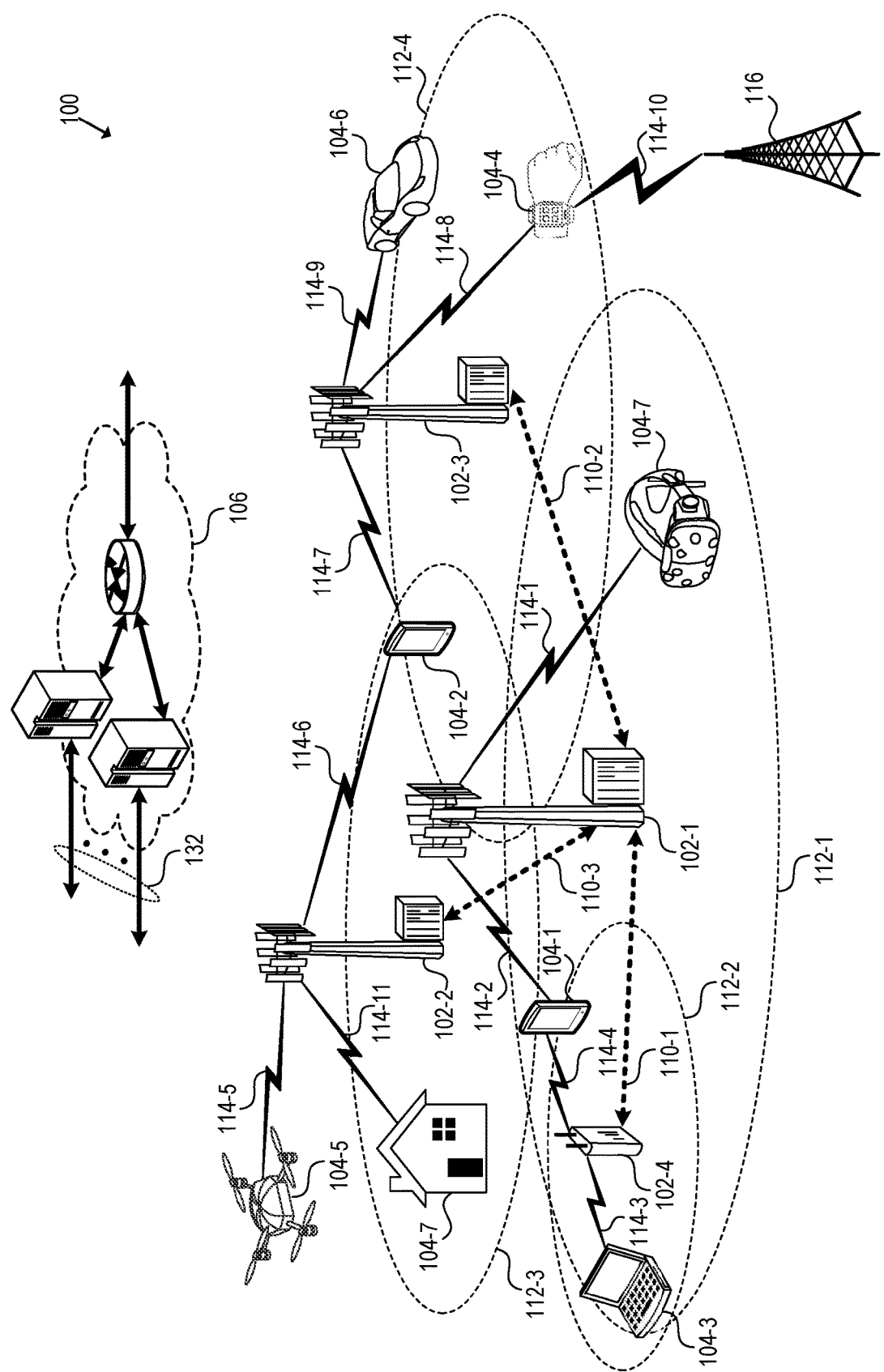
FIG. 1 is a block diagram that illustrates a wireless communications system.

Various features of the technologies described herein will become more apparent to those skilled in the art from a study of the Detailed Description in conjunction with the drawings. Embodiments are illustrated by way of example and not limitation in the drawings, in which like references may indicate similar elements. While the drawings depict various embodiments for the purpose of illustration, those skilled in the art will recognize that alternative embodiments may be employed without departing from the principles of the technologies. Accordingly, while specific embodiments are shown in the drawings, the technology is amenable to various modifications.

DETAILED DESCRIPTION

The disclosed technology includes a 5G network security system that can monitor and control incoming or outgoing network traffic based on, for example, a vulnerability-risk-threat (VRT) framework. The security system has features that are dynamically instantiated to establish a barrier between a trusted 5G network devices and functions and untrusted external networks and devices. For example, a surge in network traffic at the edge of the 5G network could indicate a security threat, which triggers instantiation of the security system at a particular region where the surge is occurring. The security system includes tools that manage diverse forms of data and thwart potential cyberattacks.

In one aspect of the technology, the security system can sort through incoming network traffic at the edge of a 5G network to mitigate cyberattacks. For example, the security system can sort network traffic into categories of traffic types (e.g., user, control, or management traffic), which are further classified by security level (e.g., high, medium, low). The security system can dynamically adjust a network resource (e.g., an available bandwidth) and prioritize dispatching the network traffic at the edge based on each category and classification of the network traffic.

In another aspect of the technology, the security system implements a VRT security model. The VRT security model is used to characterize (e.g., label) network traffic according to VRT parameters: a vulnerability parameter relating to a state or condition of an internal network element (e.g., device) or function that is susceptible to a cyberattack; a risk parameter relating to a present scope or potential harm of the cyberattack by an external source; and a threat parameter relating to a probability or source of a future cyberattack by an external source. The "external" exposure of the "internal" network refers to sources of a cyberattack that are outside the scope of the network protected by the security system. The security system can perform actions (e.g., block, quarantine, or redirect network traffic) based on a VRT score. The security system can also exchange VRT information with other security systems of other networks through a centralized system to improve performance with current updates.

In one example, the security system can tag VRT traffic on the 5G network to track whether the traffic produces malicious activity and determine how that VRT traffic affects the 5G network. In another example, the VRT traffic can be quarantined in a "sinkhole" to undergo inspection and processing that mitigates the risk of cyberattacks to the 5G network. Any quarantined traffic that is later determined to be normal is redirected to its intended destination. In yet another example, the suspicious VRT traffic can be removed entirely from the network. Information related to the tracked, quarantined, or removed VRT traffic can be reported to the central system that collects and exchanges VRT information to keep multiple security systems up-to-date about harmful VRT traffic.

In another aspect of the technology, the security system isolates suspicious network traffic to induce malicious activity without harming the 5G network. That is, the security system can "incubate" network traffic to determine whether that traffic is malicious VRT traffic. The potentially malicious VRT traffic can be diverted to an isolated environment that mimics a process or intended destination (e.g., a virtual process or destination). The network traffic remains in the isolated environment for a time period sufficient to induce malicious activity. If the time period expires without detection of any malicious activity occurring, the network traffic can be rerouted to its intended destination. In one example, the detected VRT traffic is reported to a central system to exchange VRT information among security systems of different networks. As such, the security system can improve its ability to detect malicious network traffic based on VRT information exchanged among security systems.

In another aspect of the technology, the security system has agent components that are distributed across different networks. A central component can exchange VRT information with the agent components to coordinate detection and actions to thwart cyberattacks in a harmonized manner. That is, an agent component is updated based on local VRT information and the VRT information of other agents to improve local discovery and processing of VRT traffic.

In yet another aspect of the technology, the security system can selectively direct network traffic from the edge of the 5G network based on its association with certain functions, applications, etc. The directed traffic can be temporarily quarantined or sent over a different network or path to an intended destination or another destination to secure the 5G network. Further, network traffic can be redirected for some functions or applications that are prioritized over others to improve security.

The described technology can thus safeguard a wireless network infrastructure by using various techniques to dynamically deploy security resources on-demand while an elevated cyberattack risk persists. Additional techniques are described in the assignee's related applications including U.S. patent application Ser. No. 16/921,781 filed Jul. 6, 2020, titled "Security System for Vulnerability-Risk-Threat (VRT) Detection," U.S. patent application Ser. No. 16/921,791 filed Jul. 6, 2020, titled "Security System with 5G Network Traffic Incubation," U.S. patent application Ser. No. 16/921,798 filed Jul. 6, 2020, titled "Distributed Security System for Vulnerability-Risk-Threat (VRT) Detection," and U.S. patent application Ser. No. 16/921,803 filed Jul. 6, 2020, titled "Security System for Directing 5G Network Traffic," each of which are incorporated by reference in their entireties for all purposes and filed concurrently herewith.

Wireless Communications System

FIG. 1 is a block diagram that illustrates a wireless communication system 100 ("system 100") in which aspects of the disclosed technology are incorporated. The system 100 includes base stations 102-1 through 102-4 (also referred to individually as "base station 102" or collectively as "base stations 102"). A base station is a type of network access node (NAN) that can also be referred as a cell site, a base transceiver station, or a radio base station. The system 100 can include any combination of NANs including an access point, a radio transceiver, a gNodeB (gNB), NodeB, eNodeB (eNB), Home NodeB, a Home eNodeB, or the like.

The NANs of a network formed by the system 100 also include wireless devices 104-1 through 104-8 (referred to individually as "wireless device 104" or collectively as "wireless devices 104") and a core network 106. The wireless devices 104-1 through 104-8 are capable of communication using various connectivity standards. For example, a 5G communication channel can use mmW access frequencies of 28 GHz. In some implementations, the wireless device 104 can operatively couple to a base station 102 over an LTE/LTE-A communication channel, which is referred to as a 4G communication channel.

The core network 106 can provide, manage, or control security services, user authentication, access authorization, tracking, Internet Protocol (IP) connectivity, and other access, routing, or mobility functions. The base stations 102 interface with the core network 106 through a first set of backhaul links 108 (e.g., S1) and can perform radio configuration and scheduling for communication with the wireless devices 104 or can operate under the control of a base station controller (not shown). In some examples, the base stations 102 can communicate, either directly or indirectly (e.g., through the core network 106), with each other over a second set of backhaul links 110-1 through 110-3 (e.g., X1), which can be wired or wireless communication links.

The base stations 102 can wirelessly communicate with the wireless devices 104 via one or more base station antennas. The cell sites can provide communication coverage for geographic coverage areas 112-1 through 112-4 (also referred to individually as "coverage area 112" or collectively as "coverage areas 112"). The geographic coverage area 112 for a base station 102 can be divided into sectors making up only a portion of the coverage area (not shown). The system 100 can include base stations of different types (e.g., macro and/or small cell base stations). In some implementations, there can be overlapping geographic coverage areas 112 for different service environments (e.g., Internet-of-Things (IOT), mobile broadband (MBB), vehicle-to-everything (V2X), machine-to-machine (M2M), machine-to-everything (M2X), ultra-reliable low-latency communication (URLLC), machine-type communication (MTC)).

In some examples, the system 100 can include a 5G network and/or an LTE/LTE-A network. In an LTE/LTE-A network, the term eNB is used to describe the base stations 102 and, in 5G or new radio (NR) networks, the term gNBs is used to describe the base stations 102 that include mmW communications. The system 100 can form a heterogeneous network in which different types of base stations provide coverage for various geographical regions. For example, each base station 102 can provide communication coverage for a macro cell, a small cell, and/or other types of cells. As used herein, the term "cell" can relate to a base station, a carrier or component carrier associated with the base station, or a coverage area (e.g., sector) of a carrier or base station, depending on context.

A macro cell generally covers a relatively large geographic area (e.g., several kilometers in radius) and can allow unrestricted access by wireless devices with service subscriptions with the network provider. A small cell is a lower-powered base station, as compared with a macro cell, and can operate in the same or different (e.g., licensed, unlicensed) frequency bands as macro cells. Examples of small cells include pico cells, femto cells, and micro cells. A pico cell can cover a relatively smaller geographic area and can allow unrestricted access by wireless devices with service subscriptions with the network provider. A femto cell covers a relatively small geographic area (e.g., a home) and can provide restricted access by wireless devices having an association with the femto cell (e.g., wireless devices in a closed subscriber group (CSG), wireless devices for users in the home). A base station can support one or multiple (e.g., two, three, four, and the like) cells (e.g., component carriers). All fixed transceivers noted herein that provide access to the network are NANs.

The communication networks that accommodate various disclosed examples can be packet-based networks that operate according to a layered protocol stack. In the user plane, communications at the bearer or Packet Data Convergence Protocol (PDCP) layer can be IP-based. A Radio Link Control (RLC) layer then performs packet segmentation and reassembly to communicate over logical channels. A Medium Access Control (MAC) layer can perform priority handling and multiplexing of logical channels into transport channels. The MAC layer can also use Hybrid ARQ (HARQ) to provide retransmission at the MAC layer, to improve link efficiency. In the control plane, the Radio Resource Control (RRC) protocol layer provides establishment, configuration, and maintenance of an RRC connection between a wireless device 104 and the base stations 102 or core network 106 supporting radio bearers for the user plane data. At the Physical (PHY) layer, the transport channels are mapped to physical channels.

As illustrated, the wireless devices 104 are distributed throughout the system 100, where each wireless device 104 can be stationary or mobile. A wireless device can be referred to as a mobile station, a subscriber station, a mobile unit, a subscriber unit, a wireless unit, a remote unit, a handheld mobile device, a remote device, a mobile subscriber station, an access terminal, a mobile terminal, a wireless terminal, a remote terminal, a handset, a mobile client, a client, or the like. Examples of a wireless device include user equipment (UE) such as a mobile phone, a personal digital assistant (PDA), a wireless modem, a handheld mobile device (e.g., wireless devices 104-1 and 104-2), a tablet computer, a laptop computer (e.g., wireless device 104-3), a wearable (e.g., wireless device 104-4). A wireless device can be included in another device such as, for example, a drone (e.g., wireless device 104-5), a vehicle (e.g., wireless device 104-6), an augmented reality/virtual reality (AR/VR) device such as a head-mounted display device (e.g., wireless device 104-7), an IoT device such as an appliance in a home (e.g., wireless device 104-8), or a wirelessly connected sensor that provides data to a remote server over a network.

A wireless device can communicate with various types of base stations and network equipment at the edge of a network including macro eNBs/gNBs, small cell eNBs/gNBs, relay base stations, and the like. A wireless device can also communicate with other wireless devices either within or outside the same coverage area of a base station via device-to-device (D2D) communications.

The communication links 114-1 through 114-11 (also referred to individually as "communication link 114" or collectively as "communication links 114") shown in system 100 include uplink (UL) transmissions from a wireless device 104 to a base station 102, and/or downlink (DL) transmissions, from a base station 102 to a wireless device 104. The downlink transmissions may also be called forward link transmissions while the uplink transmissions may also be called reverse link transmissions. Each communication link 114 includes one or more carriers, where each carrier can be a signal composed of multiple sub-carriers (e.g., waveform signals of different frequencies) modulated according to the various radio technologies described above. Each modulated signal can be sent on a different sub-carrier and carry control information (e.g., reference signals, control channels), overhead information, user data, etc. The communication links 114 can transmit bidirectional communications using FDD (e.g., using paired spectrum resources) or TDD operation (e.g., using unpaired spectrum resources). In some embodiments, the communication links 114 include LTE and/or mmW communication links.

In some embodiments of the system 100, the base stations 102 and/or the wireless devices 104 include multiple antennas for employing antenna diversity schemes to improve communication quality and reliability between base stations 102 and wireless devices 104. Additionally or alternatively, the base stations 102 and/or the wireless devices 104 can employ multiple-input, multiple-output (MIMO) techniques that may take advantage of multi-path environments to transmit multiple spatial layers carrying the same or different coded data.

In some embodiments, the wireless devices 104 are capable of communicating signals via the LTE network and an mmW system (e.g., as part of a 5G/NR system). Accordingly, the wireless device 104 can communicate with the base station 102 over an LTE link and/or with a transmission point (TP) or base station (BS) over an mmW link. In another example, at least one of the base stations 102 communicates signals via the LTE network and the mmW system over one or more communication links 114. As such, a base station 116 may be referred to as an LTE+mmW eNB or gNB or as an LTE+mmW TP/BS/mmW-BS.

Managing Network Traffic on a 5G Network

The security system of the disclosed technology can sort through incoming network traffic at the edge of a 5G network to proactively mitigate cyberattacks. For example, the security system can sort network traffic into categories of traffic types (e.g., user, control, or management traffic), which are further classified by security levels (e.g., high, medium, low). For example, user traffic can include user data such as the content that users access over the network (e.g., streaming media). An example of control traffic includes network traffic that contains routing and scheduling information. An example of management traffic includes network traffic that contains information for managing the user data that is accessed by the user through a user device.

The security levels for the network traffic can be designated at its source or by a network node associated with security system. For example, a network node at the edge of the network such as a cellular tower (e.g., gNB) can decode a packet header or payload and processes at the decoded portion against a policy engine that includes rules and criteria for labeling the network traffic. One example includes policies that are maintained at a core node of the network and distributed to the network access nodes of the 5G network to process network traffic at the entry points to the network. For example, a policy-based embodiment can extract source device information and compare that source device information against policies to label communications related to emergency services with a high security level, regular communications can be labeled with a medium security level, and machine-generated communications can be labeled with a low security level.

The communications that are labeled with a high security level can be prioritized over other communications. Alternatively, a policy-based embodiment can label communications that are likelier to harm the 5G network with a high security level and their communications can be delayed compared to lower security level communications. Hence, the "security levels" provide a framework for sorting communications that can be prioritized based on security concerns that arise from communications. The security system can dynamically adjust a network resource (e.g., an available bandwidth) and prioritize dispatching the network traffic at the edge of the 5G network based on each category and classification of the network traffic.

Figure 2:
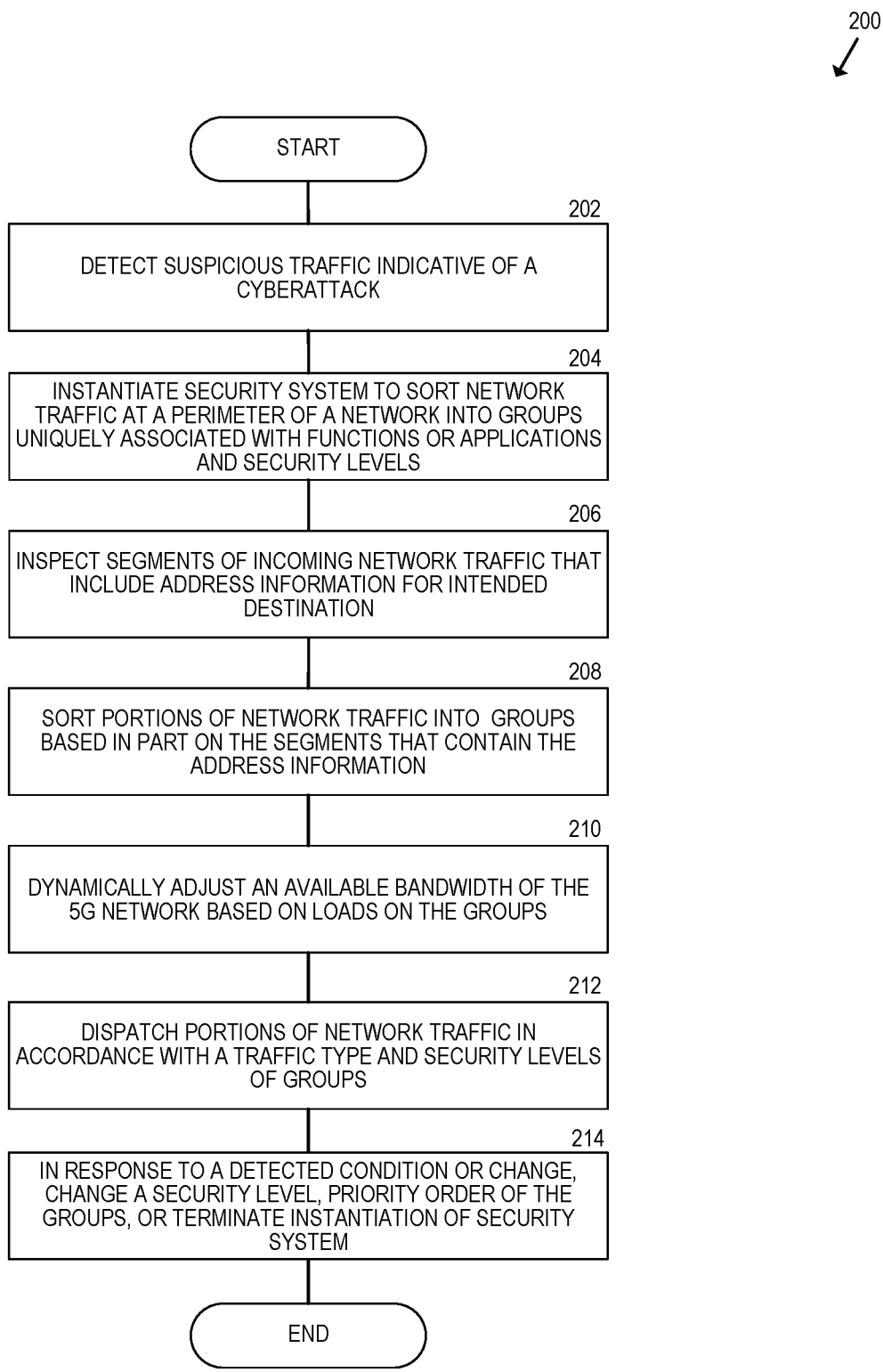
FIG. 2 is a flowchart that illustrates a method for managing network traffic with a security system at the edge of a 5G network.

FIG. 2 is a flowchart that illustrates an example of a method 200 for managing network traffic with a security system at the edge of the 5G network. In one example, a network security appliance located at the edge of the 5G network includes the security system. An embodiment of the security system includes a network appliance or edge device that operates like, or in fact is, a firewall to process incoming or outgoing network traffic. An "edge" device can include any device that provides an entry point into a network, including any of the user devices noted above. As such, the security system can secure the 5G network from the edge of the network.

At 202, the 5G network detects suspicious network traffic. For example, an edge device can detect suspicious traffic by inspecting the contents of the network traffic including the source or destination addresses, a file type, etc. In another example, the security system detects machine-generated traffic based on the frequency that the network traffic arrives at the edge of the network. As such, anomalous activity such as a surge in network traffic or periodic traffic is indicative of potentially malicious traffic. The detected network traffic is thus associated with an elevated risk of a cyberattack to the 5G network.

At 204, in response to detecting the elevated risk of a cyberattack, the 5G network instantiates a security system or function thereof to sort incoming or outgoing network traffic at a perimeter of the 5G network into one of multiple groups that are each uniquely associated with one of multiple traffic types and one of multiple security levels. Alternatively or additionally, the multiple groups can be uniquely associated with multiple priority levels including a high level, a medium level, and a low level. Examples of the traffic types include a user traffic type, a control traffic type, and a management traffic type.

The multiple security levels can include a high security level, a medium security level, and a low security level, or any other hierarchical security designation. The high security level is prioritized relative to the medium security level and the medium level is prioritized relative to the low security level. In one example, the high security level is associated with an emergency service, the medium security level is associated with a business service, and the low security level is associated with a leisure or social service. Of course, the present system can employ only to traffic types and security levels, or more than three, and each of the three traffic types and security levels may include subtypes or sub-levels to further differentiate between, for example, essential businesses and nonessential or leisure/recreational businesses for medium security. Likewise, the high-security level may be divided into first responders, essential governmental organizations, and nonessential governmental organizations.

At 206, the system inspects segments of data included in the incoming network traffic. The segments of the data can contain addressing information required for the data to reach one or more intended destinations. For example, the security system can evaluate the data part and a header of a packet that is transmitted to the security system, and identify any non-compliance to protocol, spam, viruses, intrusions, and any other defined criteria to process the packet at that inspection point.

At 208, the system sorts multiple portions of the network traffic into the multiple groups based in part on the inspection of the segments of the data that contain the addressing information. Each of the multiple portions is included in a group that is associated with a matching traffic type and a matching security level. In other words, the portions of the network traffic can be bucketized into groups of communications that are labeled with the same traffic types and security labels.

At 210, the system dynamically adjusts a network resource (e.g., available bandwidth) of the 5G network based on a load of each of the multiple groups. For example, the available bandwidth can be adjusted based on the load of each of the groups relative to an expected load for the type of network traffic. In another example, the system allocates a greater amount of bandwidth to a group that contains a greater amount of high security level network traffic compared to another group that contains a lesser amount of high security level network traffic. The adjustment can be made on the fly to compensate for changing loads and conditions (e.g., network surges).

At 212, the system dispatches the multiple portions of the network traffic in accordance with a traffic type and a security level of each of the multiple groups. In other words, the timing and order in which traffic of different groups is dispatched depends on their associated type and security level. For example, control data that is labeled with a high security level can pass to its destination while user data that is labeled with a low security level is delayed to give the high security level communication preferential access to its destination. Doing so enables a network carrier to manage volatile data loads of voluminous network traffic while securing the 5G network.

At 214, the system can detect a condition or change in a condition of the 5G network. In response to the detected condition or change in the condition, the security system can change or adapt the allocated resource (e.g., the available bandwidth) for the multiple groups. In another example, the system can dynamically adjust a priority order of the multiple groups. In another example, the security system detects a change or reduction in a security threat level to the 5G network and, in response, terminates the instantiation of the security system upon dispatching the entirety of the sorted network traffic.

Vulnerability-Risk-Threat (VRT) Security System

The security system can implement the vulnerability-risk-threat (VRT) security framework. A security model is used to characterize (e.g., label) network traffic according to VRT parameters: a vulnerability parameter relating to a state or condition of an internal network element (e.g., device) or function that is susceptible to a cyberattack; a risk parameter relating to a present scope or potential harm of the cyberattack by an external source; and a threat parameter relating to a probability or source of a future cyberattack by an external source. The "external" exposure of the "internal" network refers to sources of a cyberattack that are outside the scope of the network protected by the security system.

An example of a vulnerability relates a current condition or version of hardware or software that supports a network, which could be outdated, faulty, and/or associated with known weaknesses. An example of a risk includes a physical region that is a hotspot for malicious activity such as near a government agency. An example of a threat includes access to the protected network that is available by elements that are not within the scope of the security system. For example, unknown devices may access a protected network more often during the daytime rather than nighttime. As such, the protected network is threatened more during the daytime.

As such, the security system employs multi-dimensional processing of communications at the edge of the 5G network to secure the network from cyberattacks. Based on a VRT score for a communication, the security system can perform actions (e.g., block, quarantine, or redirect network traffic) to secure the network.

The security system can also exchange VRT information with other security systems of other networks through a centralized system. In another example, the security system can tag VRT traffic on the 5G network to track whether the traffic produces malicious activity and determine how that VRT traffic affects the 5G network. In another example, the VRT traffic can be quarantined in a "sinkhole" to undergo inspection and processing that mitigates the risk of harm to the 5G network. Any quarantined traffic that is later determined to be normal is redirected to its intended destination. In yet another example, suspicious VRT traffic can be removed entirely (e.g., deleted). The information related to the tracked, quarantined, or removed VRT traffic can be reported to the central database that collects and exchanges VRT information to keep multiple security systems up-to-date about harmful VRT traffic.

Figure 3:
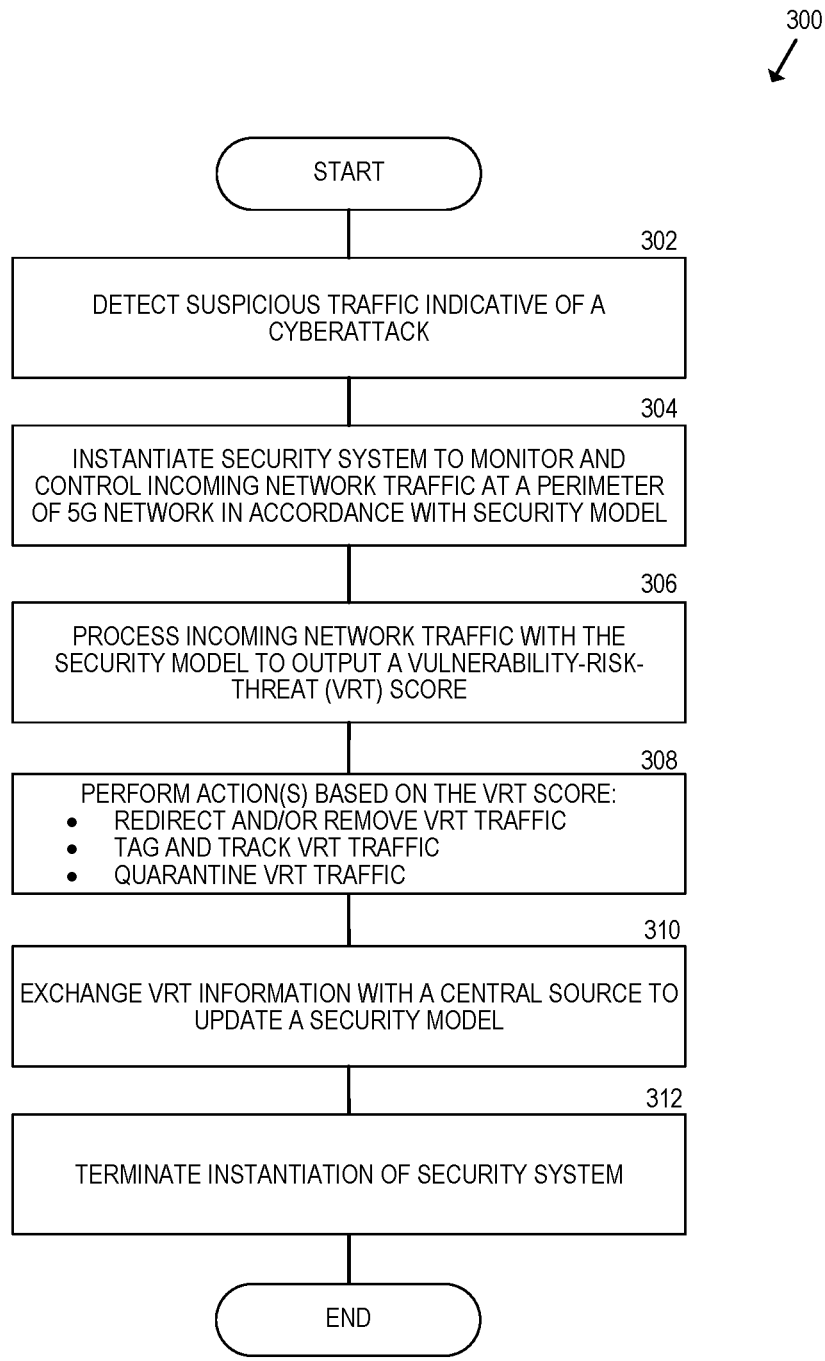
FIG. 3 is a flowchart that illustrates a method performed by the security system for managing vulnerability-risk-threat (VRT) traffic.

FIG. 3 is a flowchart that illustrates a method 300 for managing VRT traffic with a security system at the edge of a 5G network. An embodiment of the security system includes a network appliance or edge device that operates like a firewall to process incoming or outgoing network traffic. As such, the security system can secure the 5G network by managing network traffic from the edge of the network.

At 302, the security system detects suspicious network traffic. For example, the system can detect suspicious traffic by inspecting the contents of incoming network traffic including the source or destination addresses, a file type, etc. In another example, the security system detects machine generated traffic based on the frequency that the network traffic arrives at the edge of a network. As such, anomalous activity such as a surge in network traffic or periodic traffic is indicative of potentially malicious traffic. The detected network traffic is thus associated with an elevated risk of a cyberattack to the 5G network.

At 304, the security system instantiates the security function to monitor and control incoming network traffic at a perimeter of the 5G network in accordance with a security model. The security model is a framework for security based on a vulnerability parameter, a risk parameter, and a threat parameter. The vulnerability parameter can relate to a susceptibility of the 5G network to a cyberattack, the risk parameter can relate to a scope of the cyberattack, and the threat parameter can relate to a source of the cyberattack. In one example, the security model includes a machine learning model that is trained based on VRT data collected locally and/or by multiple security systems of multiple networks.

The vulnerability parameter can receive certain data from the 5G network edge, such as manufacturer and model codes to identify a device initiating the communication. For example, a mobile phone may have a low vulnerability value because the phone itself includes multiple security features, whereas an IoT sensor coupled to a particular manufacturing machine may have much lower inherent security features, and therefore may have a higher vulnerability parameter.

The risk parameter can relate to network scope and accessibility. For example, if the 5G network edge device is seeking to communicate only in a home network, then the risk parameter is lower, whereas with an edge device seeking to send a data file to a destination across multiple different and larger networks, the risk parameter is higher because of a greater possibility of attacking or infecting multiple larger networks.

The threat parameter can relate to a destination and a request. For example, a low threat parameter can be associated with requesting a local database to retrieve a file. Conversely, a high threat parameter can be associated with a request to change data in a remote database associated with a .mil or .gov domain.

At 306, the system processes the network traffic with the security model to output a VRT score that characterizes (e.g., labels) the network traffic in relation to the vulnerability parameter, the risk parameter, and the threat parameter. For example, network traffic can be measured relative to threshold values for these three parameters. The VRT score is determined based on a combination of the measurements for each of the parameters. For example, network traffic that exceeds threshold values for any of the three parameters can be labeled as potentially malicious VRT traffic. The relative values for each parameter can be weighted differently depending on the type of network such that the degree to which a communication exceeds a threshold for one parameter can have a greater impact on the VRT score compared to another parameter. Network traffic that does not exceed the threshold values for any parameter may be treated as normal or harmless network traffic.

At 308, the system performs one or more actions based on the VRT score to mitigate the risk of the cyberattack. The action(s) can include blocking incoming network traffic at the perimeter of the 5G network. In one example, based on the VRT score, the system can embed a tag in the network traffic to indicate that the network traffic includes potentially malicious VRT traffic. The tag can include metadata stored in a portion of the network traffic that includes address information of intended destinations of the network traffic (e.g., in headers). The security system dispatches the VRT traffic with the embedded tag to one or more intended destinations. The embedded tag is used to track potential malicious activity on the 5G network. The system can compare the tracked activity with an expected activity to discover whether the network traffic includes malicious VRT traffic.

In another example, the system can determine that the VRT score exceeds a containment threshold. A VRT score less than the containment threshold is indicative of non-VRT traffic or network traffic that is not malicious and a VRT score greater than the threshold value is indicative of potentially malicious VRT traffic. In response to network traffic with a VRT score that exceeds the containment threshold, the system can divert the network traffic to a containment area in lieu of an intended destination. The containment area can be separate from the 5G network, to inspect incoming network traffic and remove malicious VRT network traffic without harming the 5G network. More generally, the security system can redirect the incoming network traffic to a destination other than an intended destination of the incoming network traffic. For example, network traffic can be temporarily stored and later dispatched upon determining that the network traffic is unrelated to malicious activity.

At 310, the system can communicate at least an indication of the network traffic to a central system (e.g., database). The central database manages VRT information collected from multiple networks including the 5G network. The security system can receive an update from the central database, which can include VRT information collected from the multiple networks, which is used to train the security model.

At 312, the instantiation of the security system or function is terminated. This can occur once the risk of the cyberattack is removed or a the cyberattack was thwarted as a result of the action taken by the security system or upon the expiration of a time period.

Incubation System

The security system can isolate suspicious network traffic and induce malicious activity without harming the network. In other words, the security system can "incubate" possible VRT traffic to determine whether that traffic is malicious. In one example, the possible VRT traffic is rerouted to an isolated environment that mimics a process or intended destination of the network traffic (e.g., executes a virtual process or destination). The potential VRT traffic remains isolated to induce malicious activity. If a time period expires without any detected malicious activity, the network traffic is rerouted back to the intended destination. In one implementation, the detected VRT traffic is reported to a central database to exchange VRT information with other security systems of other networks. As such, the security system can improve its ability to detect VRT traffic based on VRT information collected by other security systems.

Figure 4:
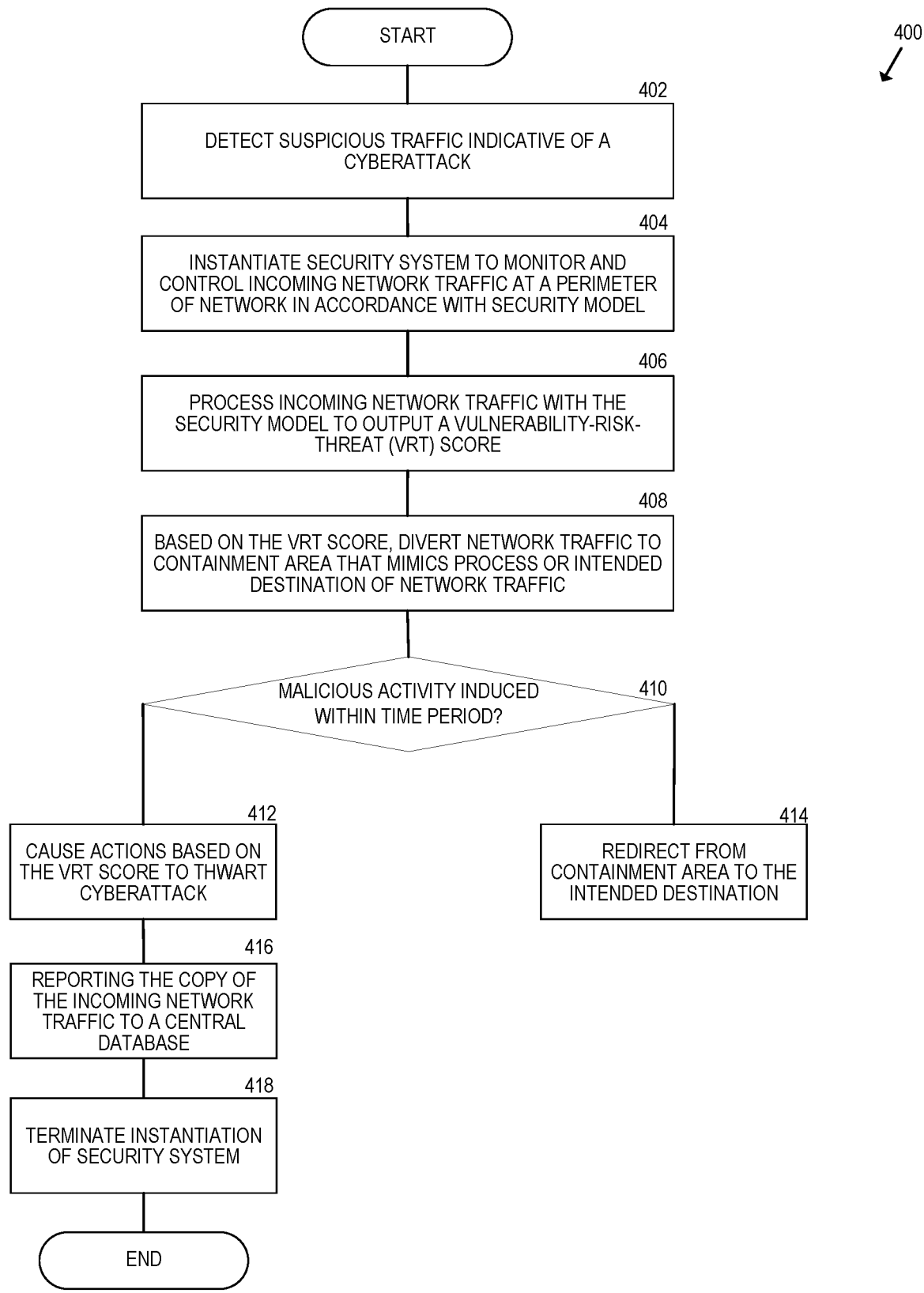
FIG. 4 is a flowchart that illustrates a method performed by the security system to induce malicious activity without harming the 5G network.

FIG. 4 is a flowchart that illustrates a method 400 for isolating network traffic on a 5G network to induce malicious activity without harming the network. An embodiment of the security system includes a network appliance or edge device that operates like a firewall to process incoming or outgoing network traffic. As such, the security system can secure the 5G network from a cyberattack by isolating suspicious network traffic and inducing activity that is indicative of malicious VRT traffic.

At 402, the 5G network detects suspicious traffic that is incoming to the network. For example, the system can detect suspicious traffic by inspecting the contents of network traffic including source or destination addresses, file type, etc. In another example, the security system detects machine generated traffic based on the frequency that the network traffic arrives at an edge of a network. As such, anomalous activity such as a surge in network traffic or periodic traffic is indicative of potentially malicious traffic. The detected network traffic is thus associated with an elevated risk of a cyberattack to the 5G network.

Unlike existing systems that support user devices, a radio access network (RAN), and core network as separate domains, the security system can integrate these components to dynamically protect a network. For example, a core network node can control the RAN edge to instantiate a firewall that protects the 5G network from malicious network traffic identified by a user device. The network access nodes (e.g., base stations) of the RAN can detect a possible cyberattack based on network traffic from user devices. In one example, the user device can detect anomalous activity or malicious data (e.g., malicious email attachment), and notify the network access node of the detection, which relays the notification to a core node. The core node can evaluate the notification with a policy engine and command the network access node to instantiate the security system if the core node identifies a likely cyberattack.

At 404, in response to detecting the potential cyberattack, the core node of the 5G network instantiates the security system or a security function to monitor and control incoming and/or outgoing network traffic at a perimeter of the 5G network in accordance with a security model. The security model is a framework for security based on a vulnerability parameter, a risk parameter, and a threat parameter as described earlier. In one example, the security model includes a machine learning model that is trained based on VRT data collected locally and/or by multiple security systems of multiple networks.

At 406, the system processes the incoming network traffic with the security model to output a VRT score that characterizes (e.g., labels) the incoming network traffic in relation to the vulnerability parameter, the risk parameter, and the threat parameter. For example, the network traffic can be measured relative to threshold values for these three parameters as described earlier.

At 408, based on the VRT score, the security system diverts the incoming network traffic to a containment area that mimics an intended destination of the incoming network traffic. For example, the containment area can mimic a designation address for an electronic communication and open that communication to check for malicious activity. The containment area can include a network node or device that is communicatively separate from the 5G network. The separate network can create a virtual environment that mimics the 5G network.

At 410, the security system mimics a process for the network traffic for a time period sufficient to induce malicious VRT traffic. The sufficiency of the time period can be set based on statistical data about the type of network traffic or other features that are correlated with malicious activity. For example, a type of media traffic could be contained for an average time period that historically takes for media traffic to produce malicious activity. In some instances, the time period is slight because malicious activity occurs upon reaching an intended destination. As such, the time period can vary depending on the network traffic, destination, etc. In another example, the time period is fixed and/or set manually. Further, the security system can provide standard acknowledgment messages to the 5G edge device to provide confirmation that the intended destination is responding, even though it has not. Therefore, the containment area operates using standard protocols and thereby provides responses importing with those protocols and representing communications expected to be received from the intended destination.

At 412, in response to detecting potentially malicious VRT traffic, the security system performs one or more actions based on the VRT score to mitigate the cyberattack. For example, an action can include preventing the incoming network traffic from being communicated over the 5G network. Other examples of actions taken by the security system are described earlier.

At 414, in response to detecting that the incoming network traffic is normal, the system redirects the normal traffic from the containment area to the intended destination. In one example, the suspicious network traffic remains in the containment area up until the time period expires and then is rerouted back unless malicious activity is detected while in the containment area.

At 416, the security system can optionally communicate an indication of the incoming network traffic (or a copy of the traffic itself) to a central system (e.g., database) that manages VRT information collected from multiple networks. The security system can later receive an update from the central database, where the update includes information about VRT traffic collected from the multiple networks, which can be used to train the security model. For example, the containment area can generate a copy of the incoming network traffic that includes the VRT traffic. The copy can be stored at a memory to preserve an initial state of the incoming network traffic and, upon detecting that the incoming network traffic is malicious, report the stored copy or metadata thereof to the central database.

At 418, the instantiation of the security system or security function is terminated. This can occur once the risk of the cyberattack is removed or a cyberattack is thwarted as a result of the action taken by the security system or upon the expiration of a time period.

Distributed Security System

The security system can be implemented with agent components that are distributed across different networks. A central component can exchange VRT information with the agent components to coordinate detection and actions to thwart cyberattacks in a harmonized manner. That is, an agent component is updated based on local VRT information and the VRT information of other agents to improve local discovery and processing of VRT traffic.

Figure 5:
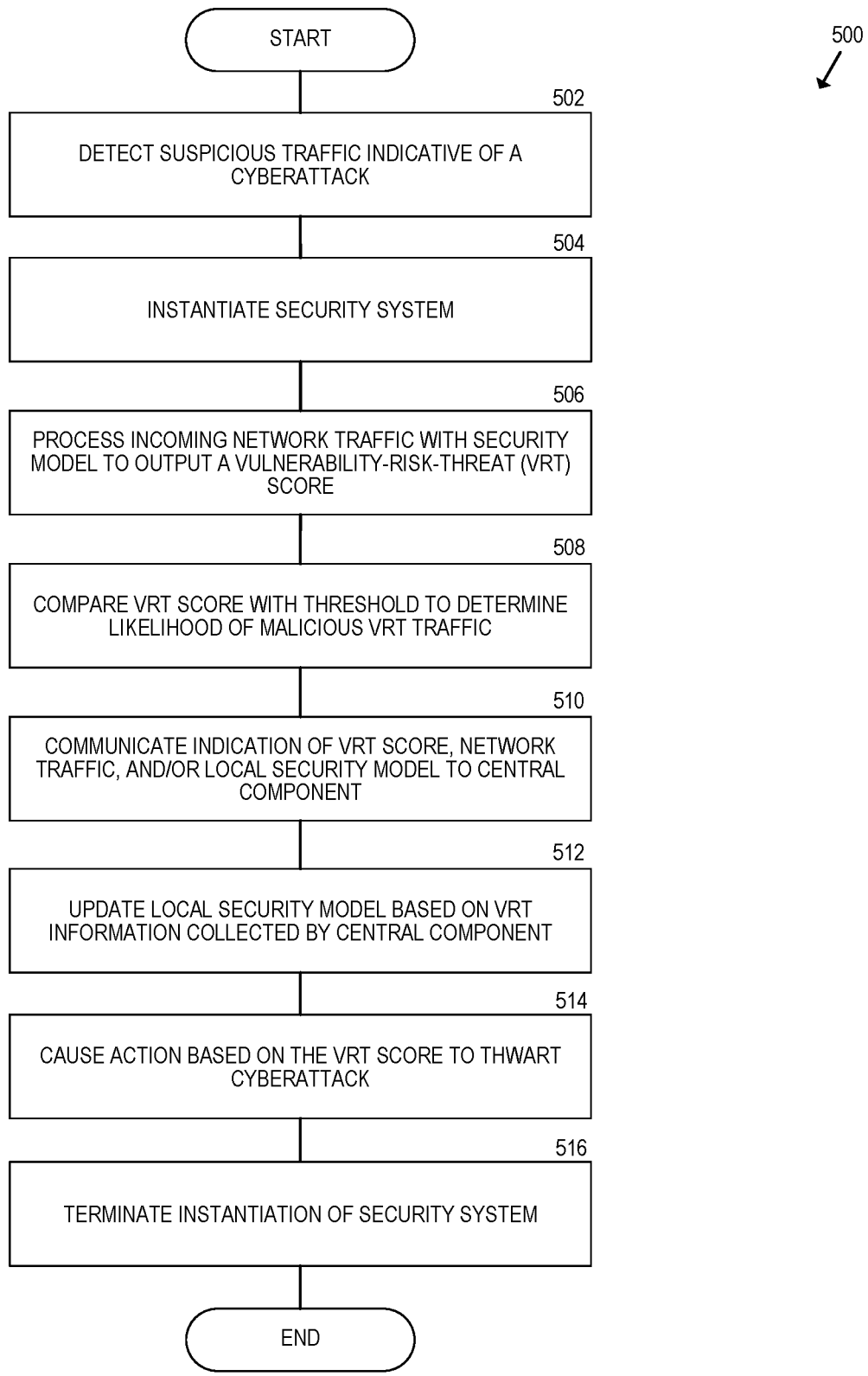
FIG. 5 is a flowchart that illustrates a method performed by a distributed security system of multiple networks.

FIG. 5 is a flowchart that illustrates a method 500 performed by a distributed security system. The security system includes agent components that are distributed at the edges of networks and can communicatively couple to a central component (or a common component). The agent components can be embodied as a network appliance or edge device that operates like a firewall to process incoming or outgoing network traffic. The common component can be embodied as a network device located at any network. In one implementation, the common component is an agent component of a network. As such, the security system can effectively secure 5G networks from cyberattacks by exchanging VRT information.

The malicious traffic can penetrate the 5G network from any point of entry of the network. Examples of points of entry include a physical location, communication medium, or communications protocol that enables access to the network. Points of entry to the 5G network can include Bluetooth®, Wi-Fi, and cellular communications protocols.

At 502, the 5G network detects suspicious traffic that is incoming to the network. For example, a network device can detect suspicious traffic from a user device by inspecting the contents of the network traffic including the source or destination addresses, file types, etc. In another example, the network device detects machine generated traffic based on the frequency that the network traffic arrives at the edge of a network. As such, anomalous activity such as a surge in network traffic or periodic traffic is indicative of potentially malicious traffic. The detected network traffic is thus associated with an elevated risk of a cyberattack to the 5G network.

At 504, in response to the detected indication of the cyberattack, an agent component is instantiated to monitor and control incoming network traffic at a perimeter of the 5G network in accordance with a security model. The security model is a framework for security based on a vulnerability parameter, a risk parameter, and a threat parameter as described earlier. In one example, each agent component is associated with a local machine learning model that is trained based on local VRT data and VRT data that is collected by multiple agent components of multiple networks.

At 506, the agent component processes the incoming network traffic with the local security model to output a VRT score that characterizes (e.g., labels) the network traffic in relation to the vulnerability parameter, the risk parameter, and the threat parameter as described earlier.

At 508, the agent component compares the VRT score with a threshold value to determine a likelihood that the incoming network traffic includes VRT traffic. That is, the agent component compares the overall VRT score with a threshold value to determine the likelihood that the network traffic is potentially malicious.

At 510, the agent component communicates to the central component at least an indication of the VRT score and at least an indication of the incoming network traffic. In one example, the agent component can communicate an indication of the incoming network traffic (or a copy of the traffic itself) and/or the local security model to a central component that manages VRT information collected from multiple networks. The copy can be stored at a memory to preserve an initial state of the incoming network traffic and, upon detecting that the incoming network traffic is malicious, report the stored copy or metadata thereof to the central component.

The central component collects VRT information from the multiple agent components distributed at respective 5G networks and produces updates for the local security models of the agent components based on a common security model, which is trained based on collective VRT information that is collected from the networks. Hence, each of the multiple agent components and their respective security models can operate independently or collectively and are updated uniformly to provide consistent detection of malicious VRT traffic.

At 512, the agent component receives an update, which includes at least an indication of the collected VRT information, from the central component. In one example, the update is used to train the security model. In another example, only the common security model is trained, and the security models of the agent components are updated based on the common security model without undergoing a local machine learning process. In another example, the local security models are trained based on VRT information obtained from the central component and trained locally so that exchanges with the central component can be less frequent, for example.

At 514, the system causes one or more actions based on the VRT score to thwart the cyberattack. The action(s) can include quarantining incoming network traffic at the agent component. Hence, the system can divert the incoming network traffic to a destination other than an intended destination. In another example, the system quarantines the incoming network traffic at a containment area that this communicatively separate and distinct from the 5G network.

At 516, the instantiation of the agent component is terminated. This can occur once the risk of the cyberattack is removed or a the cyberattack was thwarted as a result of the action taken by the security system or upon the expiration of a time period.

Directing Network Traffic at an Edge Security System

The security system can selectively direct (e.g., redirect, divert) network traffic based on its association with certain functions, applications, etc. The redirected traffic can be quarantined or sent over an unintended network or path to an intended destination or another destination. Further, network traffic can be redirected for some functions or applications that are prioritized over others to enhance security.

Figure 6:
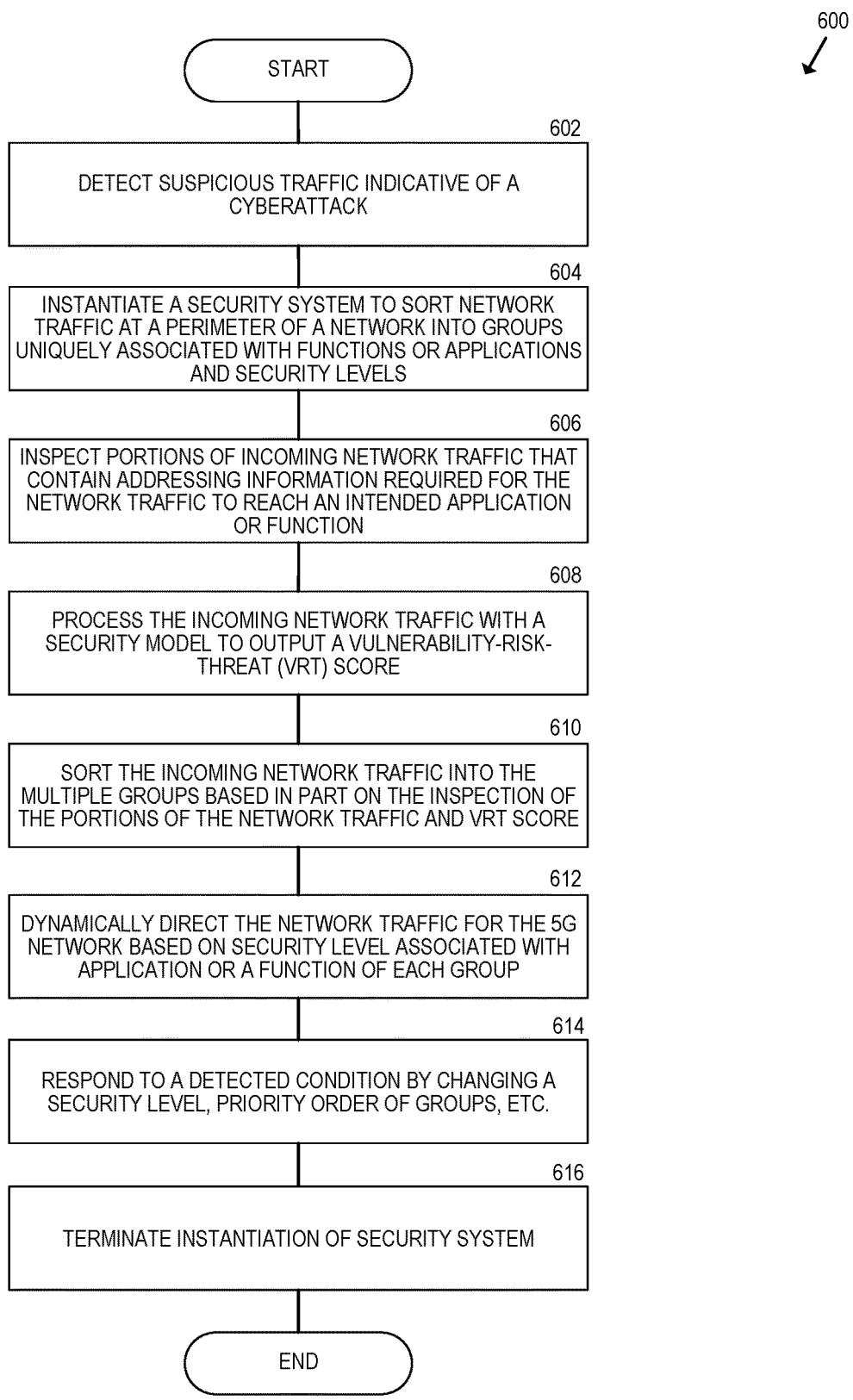
FIG. 6 is a flowchart that illustrates a method performed by the security system to direct network traffic from the edge of the 5G network.

FIG. 6 is a flowchart that illustrates a method 600 performed by a distributed VRT security system with agent components at the edges of networks. The security system can secure a 5G network from a cyberattack. For example, the security system (e.g., a network security application) can include a firewall that processes incoming and outgoing network traffic or embodied in an edge device of the 5G network.

At 602, the 5G network detects suspicious traffic that is incoming to the network. For example, the 5G network can detect suspicious traffic as described earlier. As such, anomalous activity is potentially indicative of malicious traffic. The detected network traffic is thus associated with an elevated risk of a cyberattack to the 5G network.

At 604, in response to detecting the elevated risk of the cyberattack, the 5G network instantiates the security system or a security function to sort incoming network traffic at a perimeter of the 5G network into one of multiple groups that are each uniquely associated with one of multiple functions or applications and one of multiple security levels. The security levels include a high security level, a medium security level, and a low security level as described earlier.

At 606, the system inspects portions of incoming network traffic that contain address information required for the network traffic to reach an intended application or function as described earlier.

At 608, the system processes the incoming network traffic with a security model to output a VRT score that labels the incoming network traffic in relation to the vulnerability parameter, the risk parameter, and the threat parameter as described earlier.

At 610, the incoming network traffic is sorted into the multiple groups based in part on the inspection of the portions of the network traffic and the VRT score.

At 612, the system dynamically directs (e.g., redirects, diverts) the incoming network traffic for the 5G network based on a particular security level associated with a particular application or a particular function of each of the multiple groups. For example, the security system can redirect the network traffic to a destination other than that indicated by the address information.

At 614, the system detects a condition or a change of the 5G network and responds by performing one or more actions. Examples of the actions are described earlier and can include changing a security level associated with at least one of the multiple groups, or dynamically adjusting a priority order of the multiple groups.

At 616, the instantiation of the security system is terminated. This can occur once the risk of the cyberattack is removed or a the cyberattack is thwarted as a result of the action taken by the security system or upon the expiration of a time period.

Computer System

Figure 7:
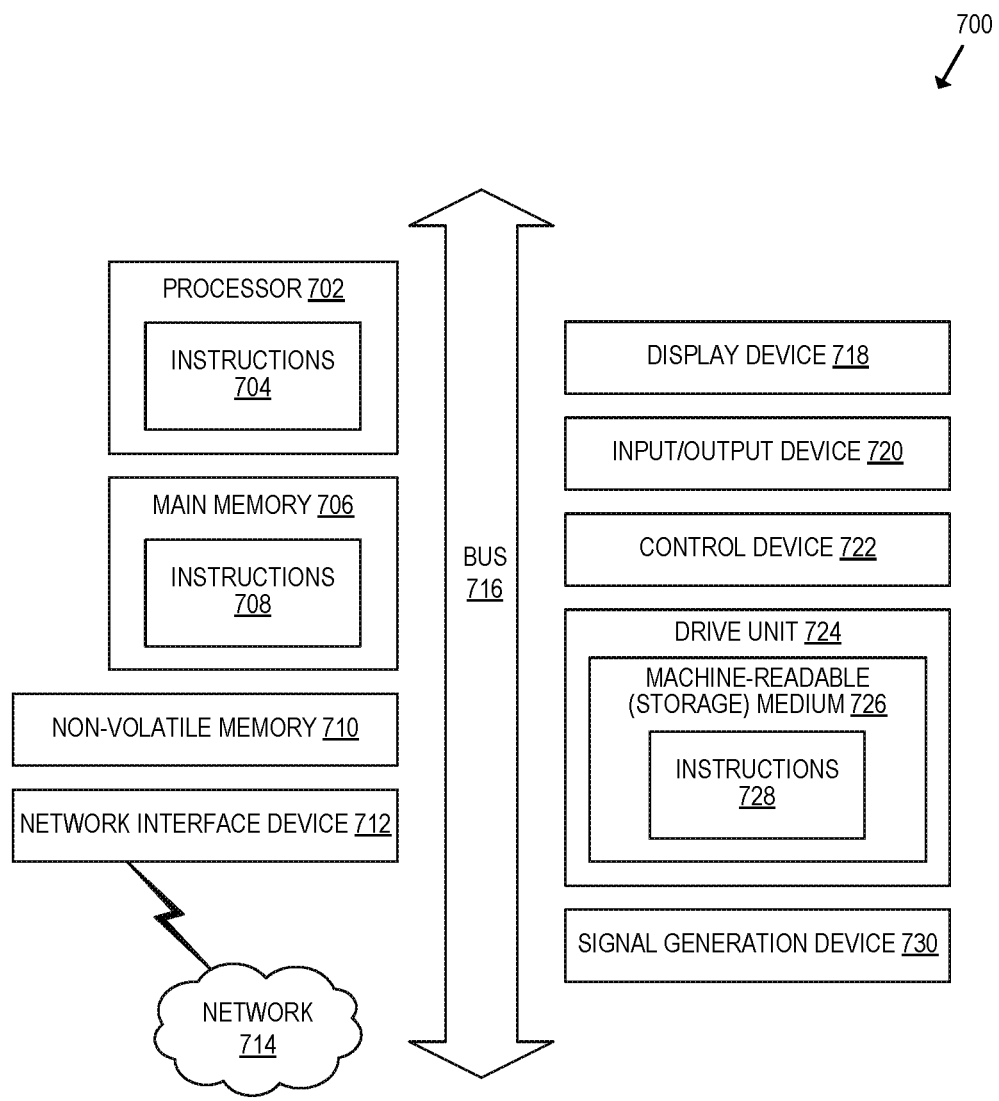
FIG. 7 is a block diagram that illustrates an example of a computing system in which at least some operations described herein can be implemented.

FIG. 7 is a block diagram that illustrates an example of a computer system 700 in which at least some operations described herein can be implemented. For example, components of the system 100 and discussed in FIGS. 2-6 can include or host components of the computing system 700.

As shown, the computer system 700 can include one or more processors 702, main memory 706, non-volatile memory 710, a network interface device 712, video display device 718, an input/output device 720, a control device 722 (e.g., keyboard and point device), a drive unit 724 that includes a storage medium 726, and a signal generation device 730 that are communicatively connected to a bus 716.

The bus 716 represents one or more physical buses and/or point-to-point connections that are connected by appropriate bridges, adapters, or controllers. The bus 716 therefore can include a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus (also referred to as "Firewire"). Various common components (e.g., cache memory) are omitted from FIG. 7 for brevity. Instead, the computer system 700 is intended to illustrate a hardware device on which components illustrated or described relative to the examples of FIGS. 1-6 and any other components described in this specification can be implemented.

The computer system 700 can take any suitable physical form. For example, the computing system 700 may share a similar architecture as that of a personal computer (PC), tablet computer, mobile telephone, game console, music player, wearable electronic device, network-connected ("smart") device (e.g., a television or home assistant device), AR/VR systems (e.g., head-mounted display), or any electronic device capable of executing a set of instructions that specify action(s) to be taken by the computing system 700. In some embodiment, the computer system 700 can be an embedded computer system, a system-on-chip (SOC), a single-board computer system (SBC) or a distributed system such as a mesh of computer systems or include one or more cloud components in one or more networks. Where appropriate, one or more computer systems 700 can perform operations in real-time, near real-time, or in batch mode.

The processor 702 can be, for example, a central processing unit, a conventional microprocessor (e.g., Intel Pentium processor). The memory (e.g., main memory 706, non-volatile memory 710, machine-readable medium 726) can be local, remote, or distributed. Although shown as single medium, the machine-readable medium 726 can include multiple media (e.g., a centralized/distributed database and/or associated caches and servers) that store one or more sets of instructions 728. The machine-readable (storage) medium 726 can include any medium that is capable of storing, encoding, or carrying a set of instructions for execution by the computing system 700. One of skill in the relevant art will recognize that the machine-readable medium 726 can include any type of medium that is accessible by the processor. The machine-readable medium 726 can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

In general, the routines executed to implement the embodiments of the disclosure may be implemented as part of an operating system or a specific application, component, program, object, module, or sequence of instructions (collectively referred to as "computer programs"). The computer programs typically comprise one or more instructions (e.g., instructions 704, 708, 728) set at various times in various memory and storage devices in computing device(s). When read and executed by the processor 702, the instruction(s) cause the computing system 700 to perform operations to execute elements involving the various aspects of the disclosure.

Although embodiments have been described in the context of fully functioning computing devices, the various embodiments are capable of being distributed as a program product in a variety of forms. Examples of machine-readable storage media, machine-readable media, or computer-readable media include recordable-type media such as volatile and non-volatile memory devices 710, removable flash memory, hard disk drives, optical disks, and transmission-type media such as digital and analog communication links.

Software is typically stored in the non-volatile memory and/or the drive unit 724. When software is moved to the memory for execution, the processor 702 will typically make use of hardware registers to store values associated with the software, and local cache that, ideally, serves to speed up execution. As used herein, a software program is assumed to be stored at any known or convenient location (e.g., non-volatile storage, hardware registers) when the software program is referred to as "implemented in a computer-readable medium." A processor can be "configured to execute a program" when at least one value associated with the program is stored in a register readable by the processor.

The network interface device 712 enables the computing system 700 to mediate data in a network 714 with an entity that is external to the computing system 700 through any communication protocol supported by the computing system 700 and the external entity. Examiner of the network interface device 712 include a network adaptor card, a wireless network interface card, a router, an access point, a wireless router, a switch, a multilayer switch, a protocol converter, a gateway, a bridge, bridge router, a hub, a digital media receiver, and/or a repeater.

Further, the interface device 712 can include a firewall that governs and/or manages permission to access/proxy data in a computer network and tracks varying levels of trust between different machines and/or applications. The firewall can be any number of modules having any combination of hardware and/or software components able to enforce a predetermined set of access rights between a particular set of machines and applications, machines and machines, and/or applications and applications (e.g., to regulate the flow of traffic and resource sharing between these entities). The firewall may additionally manage and/or have access to an access control list that details permissions including the access and operation rights of an object by an individual, a machine, and/or an application, and the circumstances under which the permission rights stand.

Examples of the I/O devices 720 include a keyboard, a mouse or other pointing device, disk drives, printers, a scanner, and other input and/or output devices, including a display device. Examples of the display device 718 can include a cathode ray tube (CRT), liquid crystal display (LCD), or any display device.

In operation, the computer system 700 can be controlled by operating system software that includes a file management system, such as a disk operating system. One example of operating system software with associated item management system software is the family of operating systems known as Windows® from Microsoft Corporation of Redmond, Washington, and their associated item management systems. Another example of operating system software with its associated item management system software is the Linux™ operating system and its associated item management system. The item management system is typically stored in the non-volatile memory and/or drive unit and causes the processor to execute the various acts required by the operating system to input and output data and to store data in the memory, including storing items on the non-volatile memory and/or drive unit.

The techniques introduced here can be implemented by programmable circuitry (e.g., one or more microprocessors), software and/or firmware, special-purpose hardwired (i.e., non-programmable) circuitry, or a combination of such forms. Special-purpose circuitry can be in the form of one or more application-specific integrated circuits (ASICs), programmable logic devices (PLDs), field-programmable gate arrays (FPGAs), etc.

Some portions of the detailed description can be presented in terms of algorithms and symbolic representations of operations on data bits within a computer memory. These algorithmic descriptions and representations are the means used by those skilled in the data processing arts to most effectively convey the substance of their work to others skilled in the art. An algorithm can refer to a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems can be used with programs in accordance with the teachings herein, or it can prove convenient to construct more specialized apparatus to perform the methods of some embodiments. The required structure for a variety of these systems will appear from the description below. In addition, the techniques are not described with reference to any particular programming language, and various embodiments can thus be implemented using a variety of programming languages.

In some circumstances, operation of a memory device, such as a change in state from a binary one to a binary zero or vice-versa, for example, can comprise a transformation, such as a physical transformation. With particular types of memory devices, such a physical transformation can comprise a physical transformation of an article to a different state or thing. For example, but without limitation, for some types of memory devices, a change in state can involve an accumulation and storage of charge or a release of stored charge. Likewise, in other memory devices, a change of state can comprise a physical change or transformation in magnetic orientation or a physical change or transformation in molecular structure, such as from crystalline to amorphous or vice versa. The foregoing is not intended to be an exhaustive list in which a change in state for a binary one to a binary zero or vice-versa in a memory device can comprise a transformation, such as a physical transformation. Rather, the foregoing is intended as illustrative examples.

Remarks

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import can refer to this application as a whole and not to any particular portions of this application. Where the context permits, words in the above Detailed Description using the singular or plural number may also include the plural or singular number respectively. The word "or" in reference to a list of two or more items covers all of the following interpretations of the word: any of the items in the list, all of the items in the list, and any combination of the items in the list.

While specific examples of technology are described above for illustrative purposes, various equivalent modifications are possible within the scope of the invention, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples such that alternative implementations can employ differing values or ranges.

Details of the disclosed embodiments may vary considerably in specific implementations while still being encompassed by the disclosed teachings. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain embodiments are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a mean-plus-function claim will begin with the words "means for." However, the use of the term "for" in any other context is not intended to invoke a similar interpretation. The applicant reserves the right to pursue such additional claim forms in either this application or in a continuing application.

I claim:

1. A method performed by a security system to manage network traffic of a telecommunications network, the method comprising:
    causing the security system to sort incoming or outgoing network traffic at the telecommunications network into one of multiple groups that are each uniquely associated with one of multiple traffic types and one of multiple security levels,
        wherein the multiple traffic types include a user traffic type, a control traffic type, and a management traffic type, and
        wherein the multiple security levels include a high security level and a low security level, and
        wherein each of multiple portions of the network traffic is included in a group that is associated with a matching traffic type and a matching security level;
    dynamically adjusting an available bandwidth of the telecommunications network based on a load and a security level of each of the multiple groups including a first group associated with the control traffic type and the high security level, a second group associated with the control traffic type and the low security level, a third group associated with the user traffic type and the high security level, and a fourth group associated with the user traffic type and the low security level,
        wherein the available bandwidth is preferentially adjusted for the first group over the second group or the third group over the fourth group; and
    dispatching the multiple portions of the network traffic in accordance with a traffic type and a security level of each of the multiple groups,
        wherein network traffic of the first group is dispatched preferentially over network traffic of the second group, and
        wherein network traffic of the third group is dispatched preferentially over network traffic of the fourth group.

2. The method of claim 1 further comprising:
    detecting a condition of the telecommunications network; and
    in response to the condition, changing the available bandwidth allocated to the multiple groups.

3. The method of claim 1 further comprising:
    dynamically adjusting a priority order of the multiple groups.

4. The method of claim 1, wherein the high security level is associated with an emergency service and the low security level is associated with a non-emergency service.

5. The method of claim 1, wherein a network security appliance includes the security system.

6. The method of claim 1, wherein the available bandwidth is adjusted based on the load of each of the multiple groups relative to an expected load for the traffic type.

7. The method of claim 1 further comprising, prior to instantiating the security system:
detecting an elevated security risk for the telecommunications network, wherein the security system is instantiated in response to the elevated security risk.

8. The method of claim 1 further comprising:
detecting a change in a security threat level to the telecommunications network; and
in response to the change, terminating an instantiation of the security system upon dispatching an entirety of the network traffic.

9. The method of claim 1, wherein dynamically adjusting the available bandwidth of the telecommunications network based on the load of each of the multiple groups comprises:
allocating a greater amount of bandwidth to a group containing a greater amount of high security level network traffic compared to another group that contains a lesser amount of high security level network traffic.

10. A security system comprising:
a processor; and
a memory coupled to the processor and configured to store instructions that, when executed by the processor, cause the security system to:
cause the security system to sort network traffic at a telecommunications network into one of multiple groups that are each uniquely associated with one of multiple traffic types and one of multiple priority levels,
wherein the multiple traffic types include a first traffic type, a second traffic type, and a third traffic type, and
wherein the multiple priority levels include a first level and a second level;
dynamically adjust an available bandwidth of the telecommunications network based on a load on and a security level of each of the multiple groups including a first group associated with the second traffic type and the first level, a second group associated with the second traffic type and the second level, a third group associated with the first traffic type and the first level, and a fourth group associated with the first traffic type and the second level,
wherein the available bandwidth is preferentially adjusted for the first group over the second group or the third group over the fourth group; and
dispatch the network traffic in accordance with a traffic type and a priority level of each of the multiple groups,
wherein network traffic of the first group is dispatched preferentially over network traffic of the second group, and
wherein network traffic of the third group is dispatched preferentially over network traffic of the fourth group.

11. The system of claim 10 further caused to, prior to sorting the network traffic into the multiple groups:
inspect segments of data included in the network traffic, wherein the segments of the data contain addressing information required for the data to reach one or more intended destinations, and
wherein the network traffic is stored based on the addressing information.

12. The system of claim 10, wherein the first level and the second level, correspond to a first security level and a low security level, respectively.

13. The system of claim 10 comprising a network security appliance that includes the processor and the memory.

14. The system of claim 10 further caused to:
detect a change in a condition of the telecommunications network; and
in response to the change, change the available bandwidth allocated to the multiple groups.

15. The system of claim 10 further caused to:
dynamically adjust a priority order of the multiple groups.

16. The system of claim 10, wherein the first level is associated with an emergency service and the second level is associated with a non-emergency service.

17. At least one non-transitory computer readable medium, storing instructions, which when executed by at least one data processor, manages network traffic of a telecommunications network by performing operations, the operations comprising:
causing a security system to sort multiple portions of incoming or outgoing network traffic at the telecommunications network into one of multiple groups that are each uniquely associated with one of multiple traffic types and one of multiple security levels,
wherein the multiple traffic types include a first traffic type, a second traffic type, and a third traffic type,
wherein the multiple security levels include a first security level, a second security level, and a third security level;
dynamically adjusting an available bandwidth of the telecommunications network based on a load and a security level of each of the multiple groups including a first group associated with the second traffic type and the first security level, a second group associated with the second traffic type and the third security level, a third group associated with the first traffic type and the first security level, and a fourth group associated with the first traffic type and the third security level,
wherein the available bandwidth is preferentially adjusted for the first group over the second group or the third group over the fourth group; and
dispatching the multiple portions of the network traffic in accordance with a traffic type and a security level of each of the multiple groups,
wherein network traffic of the first group is dispatched preferentially over network traffic of the second group, and
wherein network traffic of the third group is dispatched preferentially over network traffic of the fourth group.

18. The computer readable medium of claim 17, wherein the available bandwidth is adjusted based on the load of each of the multiple groups relative to an expected load for the traffic type.

19. The computer readable medium of claim 17, further comprising:
detecting a change in a security threat level to the telecommunications network; and
in response to the detected change, terminating an instantiation of the security system upon dispatching an entirety of the sorted network traffic.

20. The computer readable medium of claim 17, wherein dynamically adjusting the available bandwidth of the telecommunications network based on the load of each of the multiple groups comprises:
allocating a greater amount of bandwidth to a group containing a greater amount of first security level network traffic compared to another group that contains a lesser amount of first security level network traffic.

* * * * *